C. D. WILLIAMS.
HEADLIGHT FOR VEHICLES.
APPLICATION FILED JUNE 30, 1917.
1,374,344.
Patented Apr. 12, 1921.
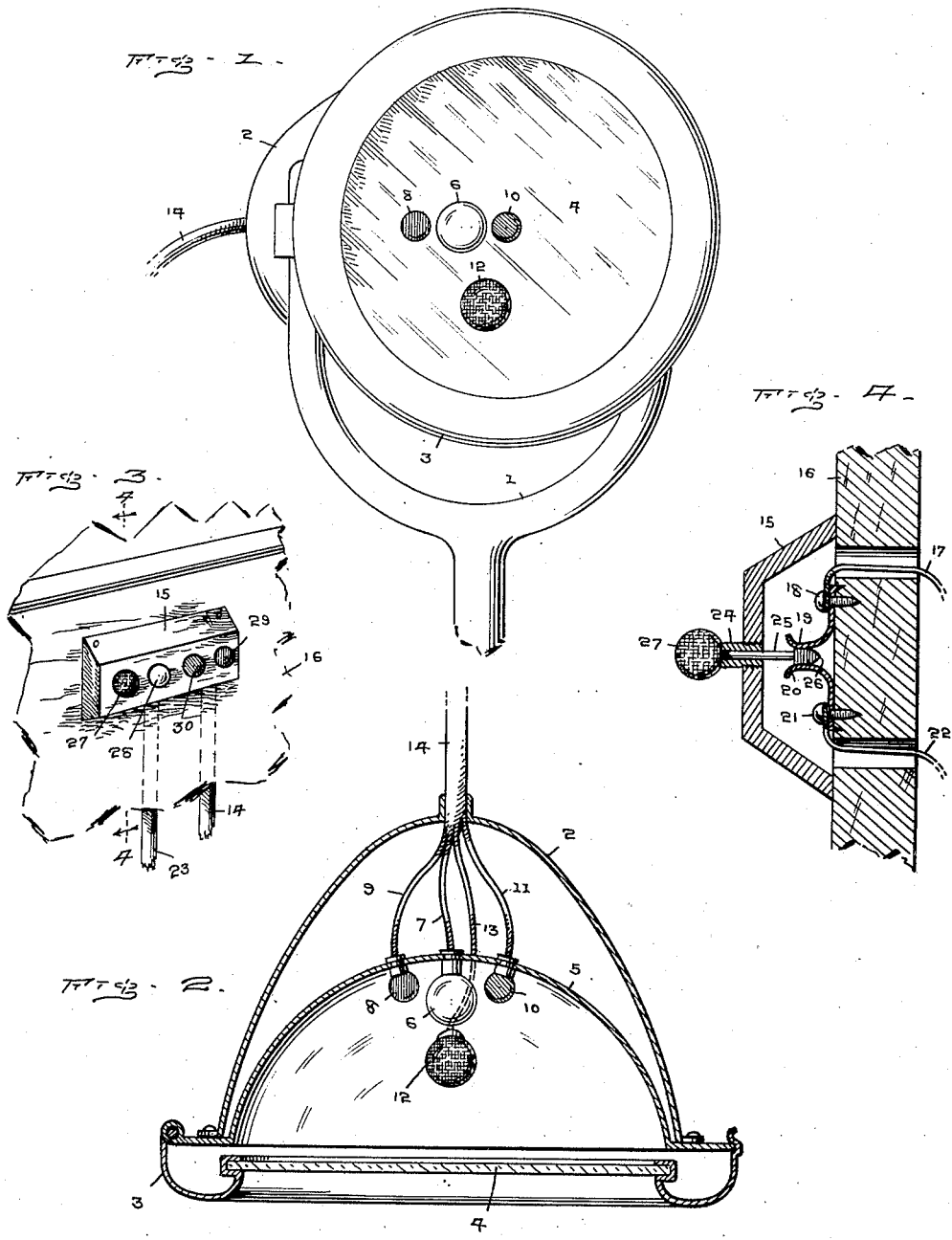
Inventor
C. D. Williams
By W. T. FitzGerald & Co.
Attorneys

UNITED STATES PATENT OFFICE.

CLARENCE D. WILLIAMS, OF MOUNTAIN PARK, OKLAHOMA.

HEADLIGHT FOR VEHICLES.

1,374,344. Specification of Letters Patent. Patented Apr. 12, 1921.

Application filed June 30, 1917. Serial No. 177,946.

*To all whom it may concern:*

Be it known that I, CLARENCE D. WILLIAMS, a citizen of the United States, residing at Mountain Park, in the county of Kiowa and State of Oklahoma, have invented certain new and useful Improvements in Headlights for Vehicles; and I do hereby declare the following to be a full, clear, and exact description of the invention, such as will enable others skilled in the art to which it appertains to make and use the same.

This invention relates to a new and novel headlight for vehicles, and has for one of its objects the provision of a device for use in connection with the headlights of automobiles, locomotives, street cars, and the like, whereby the color of the rays of light projecting from the headlights may be varied at the will of the operator of the vehicle and the like so as to display a certain colored signal in accordance with the rules of railroad companies and the like or in accordance with the ordinances for governing the kind of light to be displayed by the headlights of automobiles in the various jurisdictions.

Another object of this invention is to provide the device with means located within easy reach of the operator of the vehicle and the like, whereby the operator can readily and efficiently cause the desired color of light to be displayed from the headlights.

A further object of this invention is to provide a device which can be readily installed in the lighting systems of the vehicles now in use, especially automobiles, or which can be built in the lighting systems of the vehicles during their course of manufacture, and which device is simple in construction, efficient and durable, and which is economical to manufacture.

These and other objects and advantages will more fully appear as the nature of the invention is more clearly understood from the following specification, the subject-matter of the claims, and the illustrations in the accompanying drawings, in which, Figure 1 is a perspective view of a headlight showing the manner of mounting the various colored bulbs thereon.

Fig. 2 is a horizontal sectional view showing the detail construction of the headlight, showing a portion of the invention thereon.

Fig. 3 is a fragmentary view of the dashboard or other suitable support of a vehicle or the like, showing the means applied thereon for controlling the circuits of the headlights.

Fig. 4 is a vertical sectional view, on line 4—4 of Fig. 3, and looking in the direction of the arrows, showing the detail construction of the circuit controlling means.

I desire to here state that for the purpose of illustration, I have shown only one headlight for an automobile with my invention applied thereto, but it is to be understood that all of the headlights of a vehicle, locomotive and the like may be similarly provided with the invention, or any of the other lights thereon for the purpose of signaling, and the like, and that I am not restricted to the specific disclosures in the drawings as I may resort to any modifications and variations in the form, construction, and arrangement of the parts without departing from the spirit of the invention or exceeding the scope of the appended claims.

Referring to the drawings, wherein similar reference characters denote corresponding parts throughout the several views, 1 indicates the yoke for supporting a headlight such as is commonly employed upon automobiles. Suitably mounted upon the yoke 1 is the headlight casing 2, provided with the swinging door or closure 3 in which is mounted the glass pane 4, and within the casing 2 is the reflector 5. Centrally mounted upon the reflector 5 is the white glass electric bulb 6 connected by the wire cable 7 to a suitable source of electrical supply, and mounted within the reflector 5 at one side of the bulb 6 is the red glass electric light bulb 8 connected by the wire cable 9 to the source of electrical supply. Suitably mounted upon the reflector 5 at the opposite side of the bulb 6 is the green glass electric bulb 10 connected by the wire cable 11 to the source of electrical supply. Also mounted upon the reflector 5 and preferably just beneath the bulb 6 is the yellow glass electric bulb 12 connected by the wire cable 13 to the source of electrical supply. The sockets of the bulbs or lamps which are carried by the reflector 5, open outwardly or forwardly through the front face thereof.

The electric wire cables 7, 9, 11 and 13 of the respective bulbs 6, 8, 10 and 12 are led into the cable 14 which leads to the switch casing 15 upon the dashboard or other suitable support 16, the wires of the respective wire cables 7, 9, 11 and 13 being respectively connected to contact members upon the dashboard or other support 16 within the switch casing 15, and by referring to Fig. 4 as an example, the positive wire 17 of the wire cable 13 of the yellow bulb 12 is connected by the binding screw 18 with the spring contact 19, and also secured upon the dashboard or other support 16 within the casing 15 is the spaced coöperating spring contact 20 having the binding post 21 and to which is connected the wire 22 which is led through the cable 23 to any suitable source of electrical supply upon the vehicle or the like.

Secured in the front wall of the casing 15 is the bushing 24, there being, of course, four of these bushings, and slidably mounted through the bushing 24 is the stem 25 of the switch member, provided upon its inner end with the contact head 26 for bridging the gap between the spring contacts 19 and 20 for closing the circuit between the wires 17 and 22 when the stem 25 has been forced inwardly, and upon the outer end of the stem 25 is provided the handle knob 27, the knob 27 in this instance being either a hollow glass knob filled with yellow fluid or which may be formed of any suitable material and painted yellow to correspond with the color of the yellow glass bulb 12 within the headlight, so that it will be readily seen that when the operator of the vehicle or the like has pushed the yellow knob inwardly, a circuit is established for causing a light to shine from the yellow bulb within the headlight, or the yellow light may be dispensed with by the operator pulling the yellow knob 27 outwardly for withdrawing the head 26 from between the spring contacts 19 and 20 and thus breaking the circuit of the yellow bulb 12.

It is to be understood that the wires of the wire cables 7, 9 and 11 are connected to spring contacts similar to the spring contacts 18 and 20 within the casing 15 and that the switch members for the contacts of the respective wires of the white bulb 6, the red bulb 8 and the green bulb 10 are constructed in a manner similar to the switch member for the yellow bulb 12, the only difference being in the color of the handle knobs, the knob 28 for the white bulb 6, the knob 29 for the red bulb 8, and the knob 30 for the green bulb 10 being colored to correspond to each of the respective bulbs.

From the foregoing it will be seen that I have provided a device whereby the operator of the machine or the like may change the color or the light of the headlight or other light upon the vehicle to any color which he desires or which is required by the laws of the community in which he is operating the machine, and as the laws of different jurisdictions define the color of the light to be employed, which in most cases have defined the colors to be used as red, green and yellow, I have adopted these colors, however, if the operator of the machine happens to be in a community requiring different colors, the operator can readily comply with such laws by simply changing the color of any of the bulbs within the headlight and likewise change the color of the handle knob to correspond to the bulb or bulbs so changed; and again these lights may be used for signaling purposes in a very ready and efficient manner, as the operator of the vehicle, locomotive, and the like can instantaneously change the light from white to red or from red to green and so on by simply operating the handle knobs for controlling the respective circuits of the various lights.

Having described my invention, what I claim as new and desire to secure by Letters Patent, is:—

1. A signal headlight including a concaved reflector, a clear electric light bulb within the reflector at the center thereof, electric light bulbs of different colors at the right and left hand sides of the first named bulb for signaling the intentions to turn toward the right or the left and directing the light rays of different colors accordingly, and an electric light bulb of still another color within the reflector below the first named bulb for indicating the intentions to stop the vehicle.

2. In combination, a headlight having a reflector, a plurality of lamp sockets carried by the reflector and opening outwardly through the front face thereof, one of said sockets being arranged centrally of the reflector and the other sockets arranged oppositely and laterally of the central socket, a clear electric lamp carried by the central socket, electric lamps of different colors arranged in the other sockets and connected to an electric source, and controlling means for each colored lamp and each being of a color corresponding to the color of its respective lamp.

In testimony whereof I have signed my name to this specification in the presence of two subscribing witnesses.

CLARENCE D. WILLIAMS.

Witnesses:
E. W. CAPPS,
S. V. CARTER.